United States Patent [19]
Wooten et al.

[11] Patent Number: 5,117,780
[45] Date of Patent: Jun. 2, 1992

[54] COMBINED PORTABLE ANIMAL WASTE AND TRAINING DEVICE

[76] Inventors: Richard R. Wooten, 4403 Holmehurst Way W., Mitchellville, Md. 20716; Anton L. Huger, 6261 Woodchuck Pl., Waldorf, Md. 20603; Philip N. Middleton, 3818 Beechdown Dr., Chantilly, Va. 22021

[21] Appl. No.: 678,236

[22] Filed: Apr. 1, 1991

[51] Int. Cl.⁵ ............................................. A01K 1/035
[52] U.S. Cl. .................................................. 119/162
[58] Field of Search ................ 119/158, 162, 163, 164

[56] References Cited

U.S. PATENT DOCUMENTS

| | | | |
|---|---|---|---|
| 3,601,093 | 8/1971 | Cohen | 119/162 |
| 4,196,693 | 4/1980 | Unversaw | 119/164 |
| 4,231,321 | 11/1980 | Cohen | 119/162 |
| 4,729,342 | 3/1988 | Loctin | 119/163 |
| 4,748,700 | 6/1988 | Wooten | 119/162 X |

Primary Examiner—Robert P. Swiatek
Attorney, Agent, or Firm—Walter F. Wessendorf, Jr.

[57] ABSTRACT

A combined portable animal waste and training device whereby a pet's owner, by means of the device's training structure, can induce, teach and train the pet to eliminate its urine and feces upon the device's animal waste structure being operatively emplaced relative to a toilet bowl of a standard toilet having a toilet tank and followed by the sequential operation of the animal waste structure in depositing the urine and feces eliminated by the pet and disposed in the toilet bowl, followed by cleansing action and then followed with the flushing of the toilet tank to flush down such urine and feces in the toilet bowl.

8 Claims, 19 Drawing Sheets

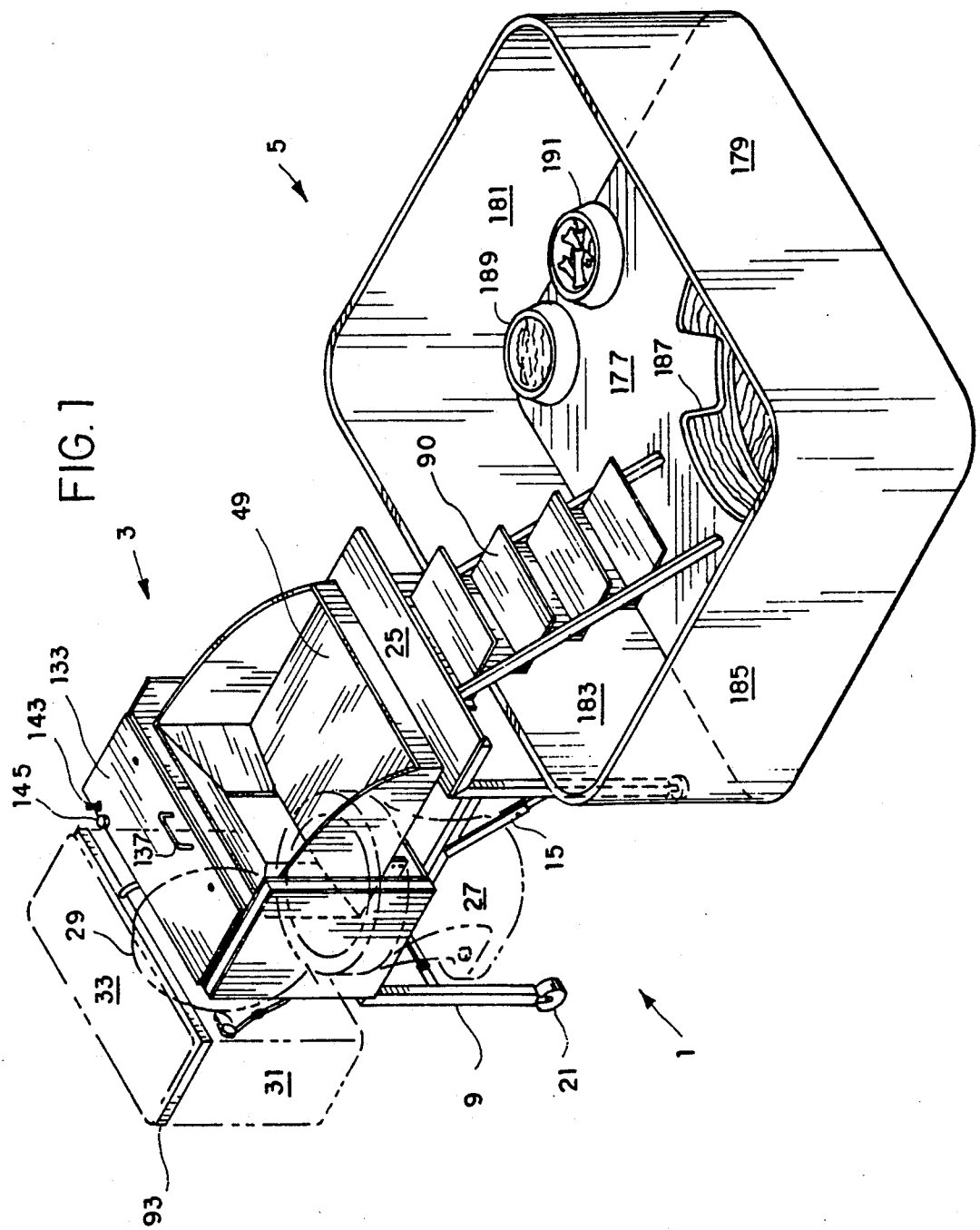

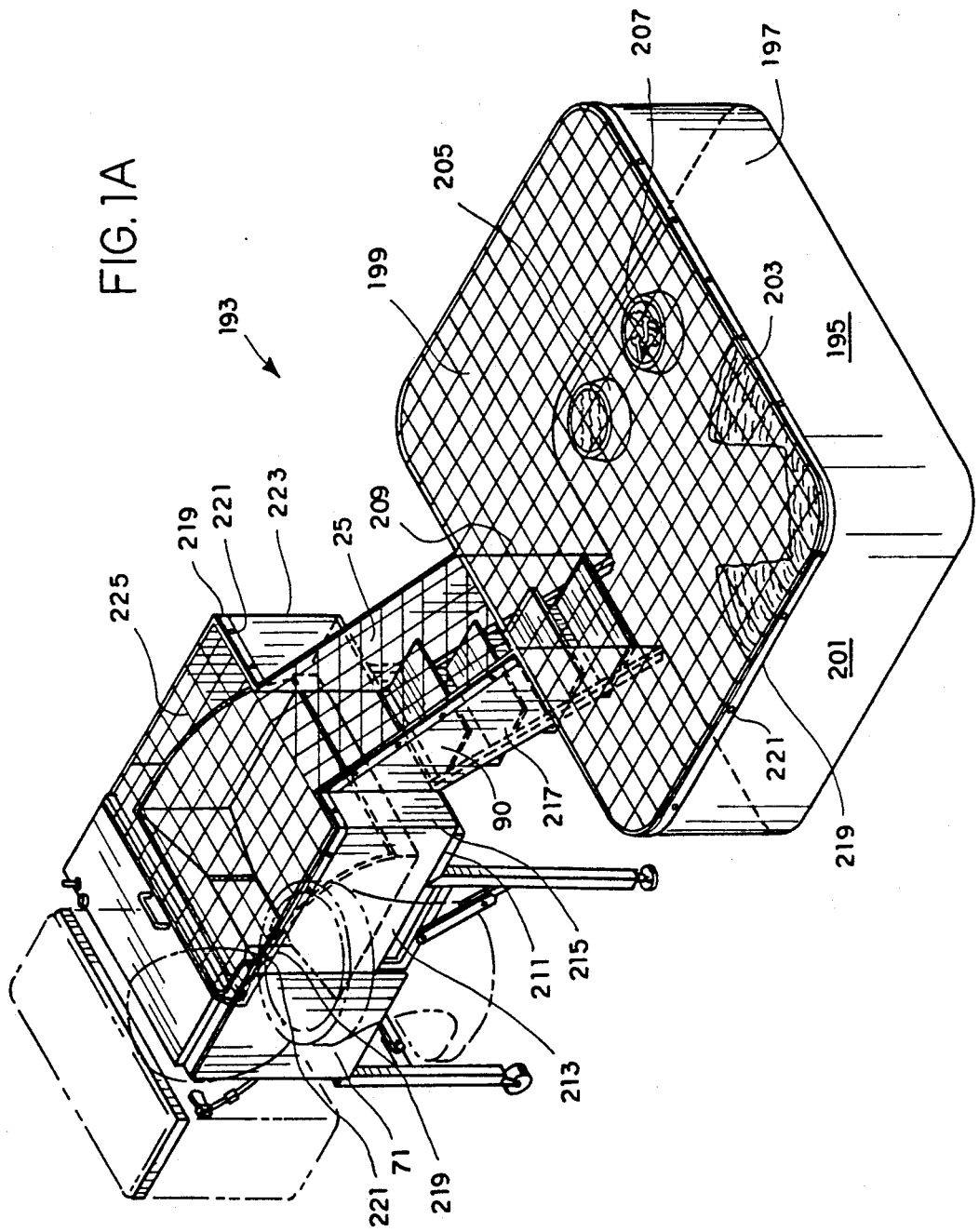

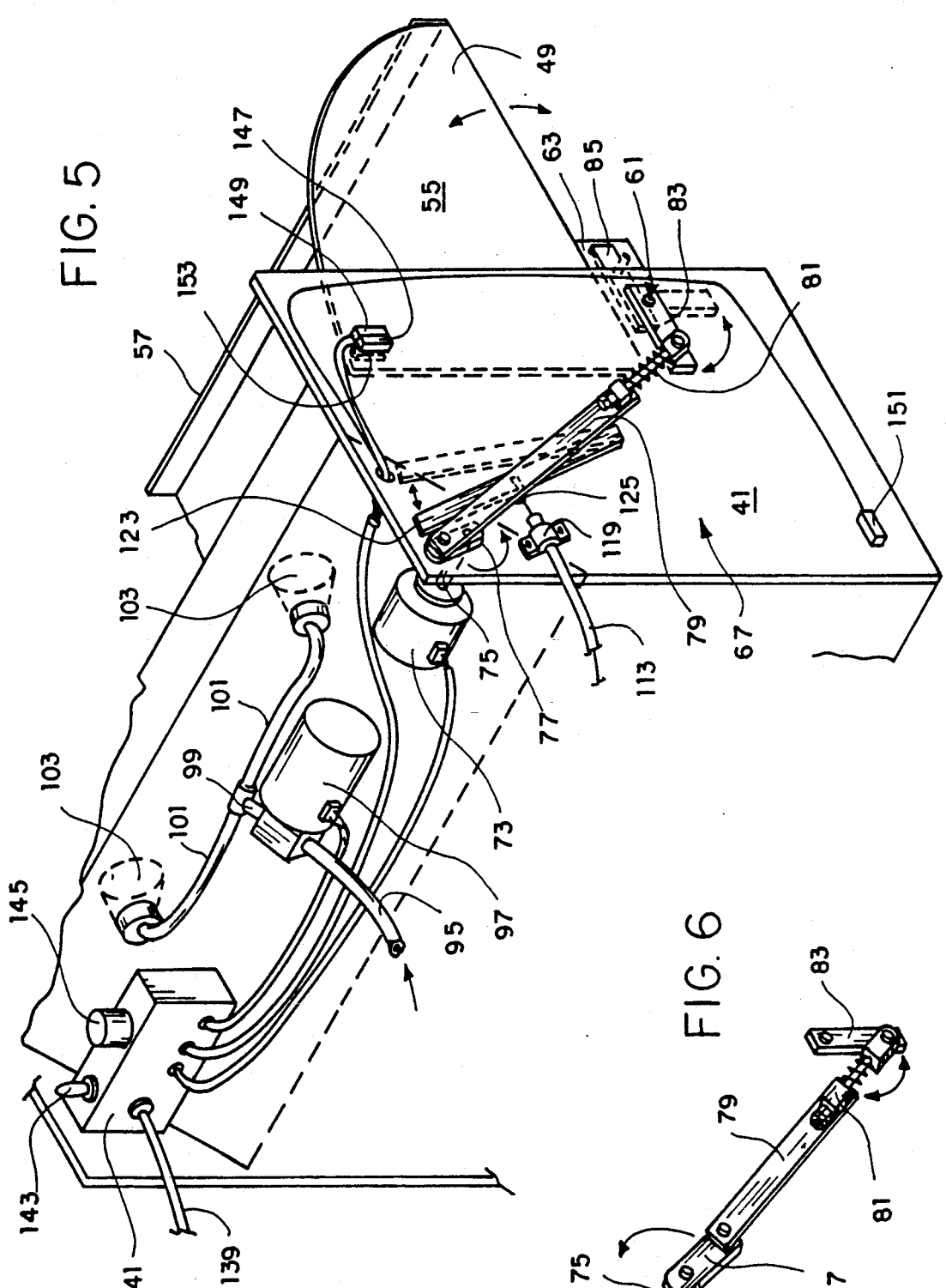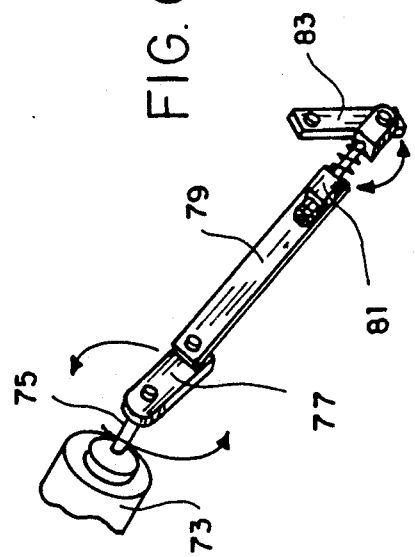

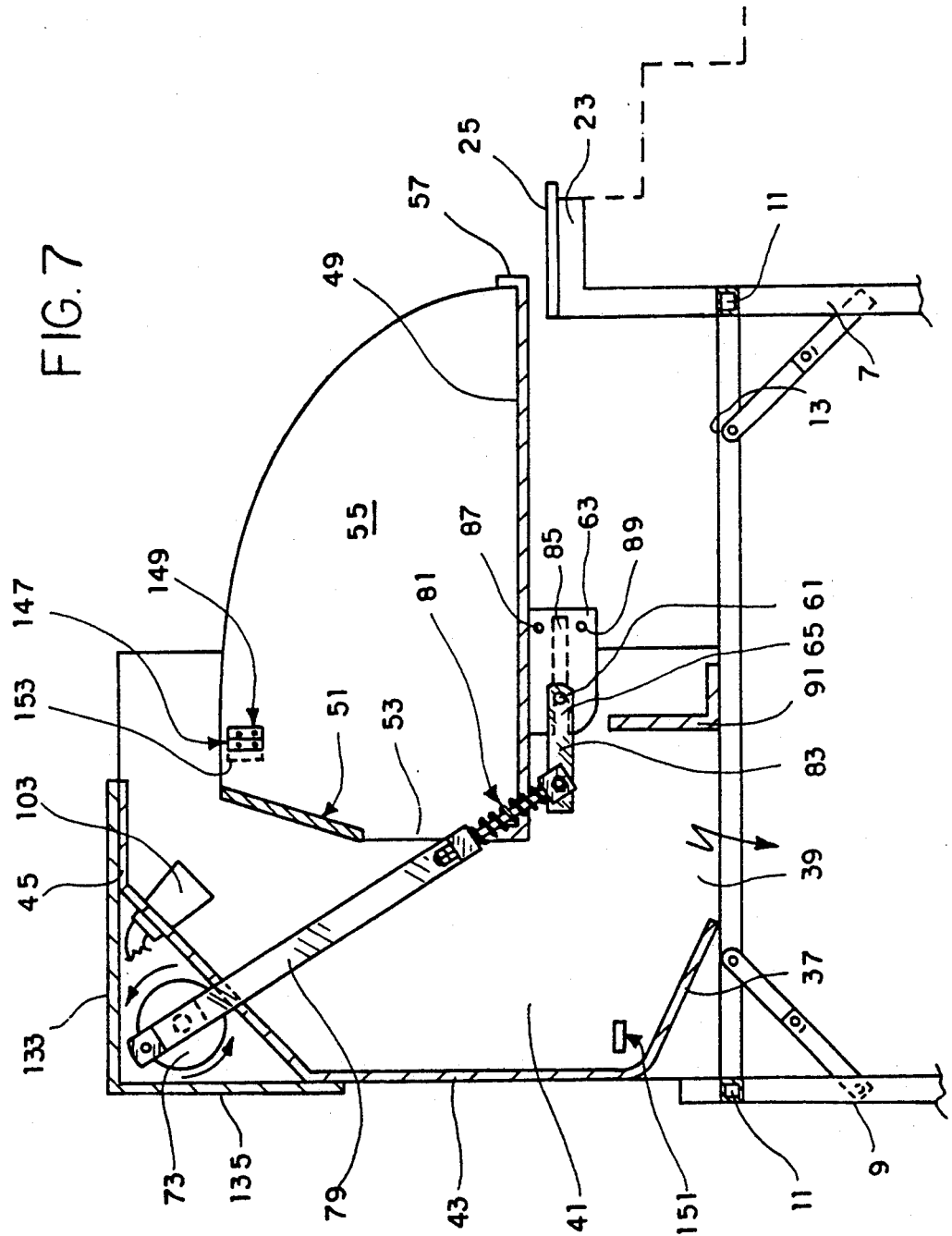

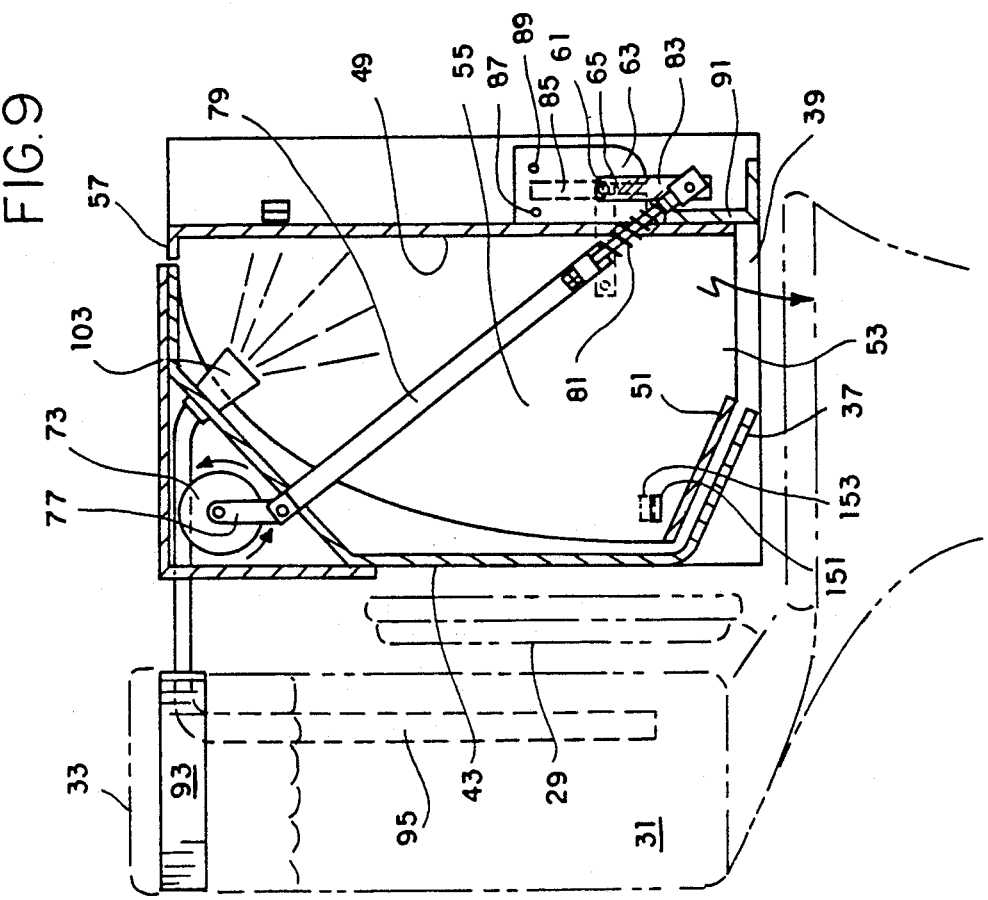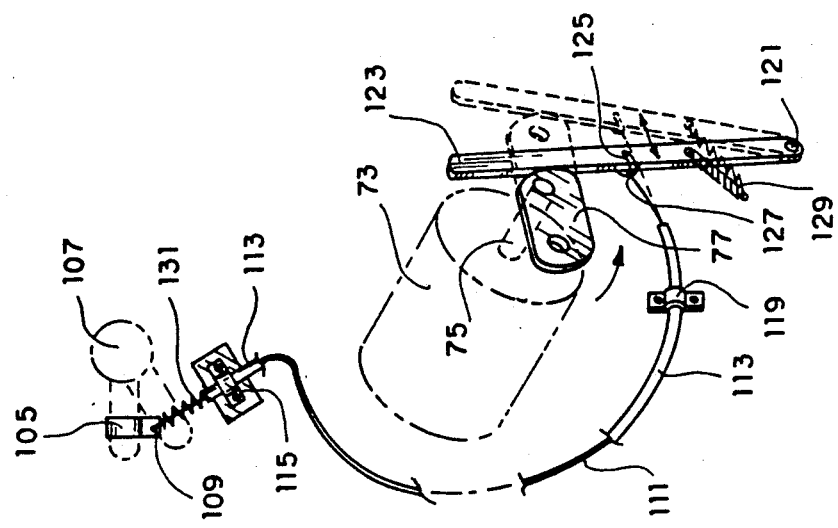

KEY FOR FIGURES 16-26

| WIRES CARRYING VOLTAGE ONLY ARE SHOWN | |
|---|---|
| ◁ | INACTIVE |
| ◀ | ACTIVATED |
| 151 [P] | PUMP SWITCH |
| 147 [H] | HOME SWITCH |
| 149 [S] | START SWITCH |
| ☐ | OPEN SWITCH |
| ▨ | CLOSED SWITCH |
| 153 ■ | MAGNET WHICH OPERATES SWITCHES |

DELAY STARTS

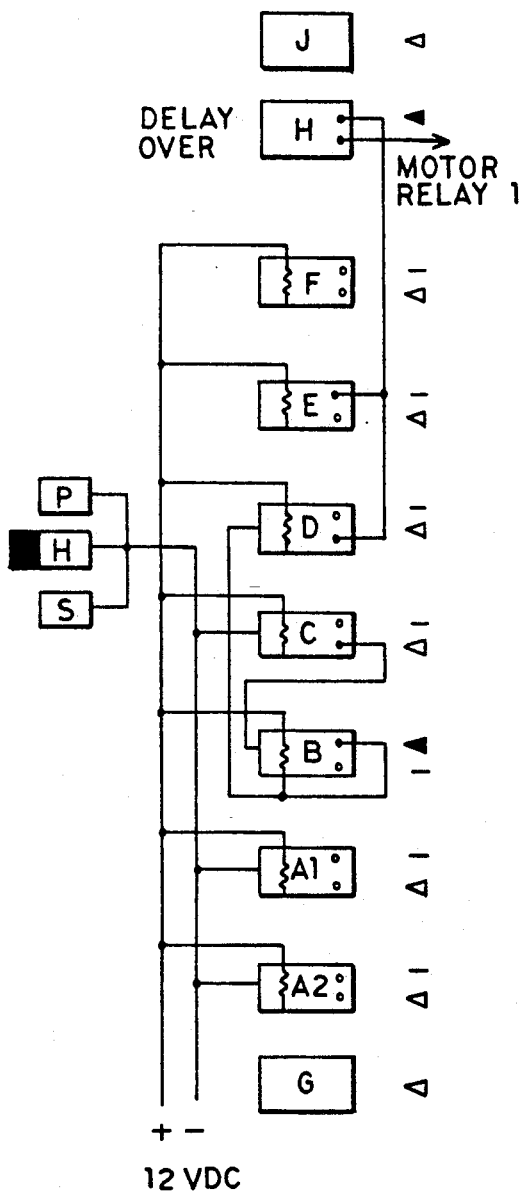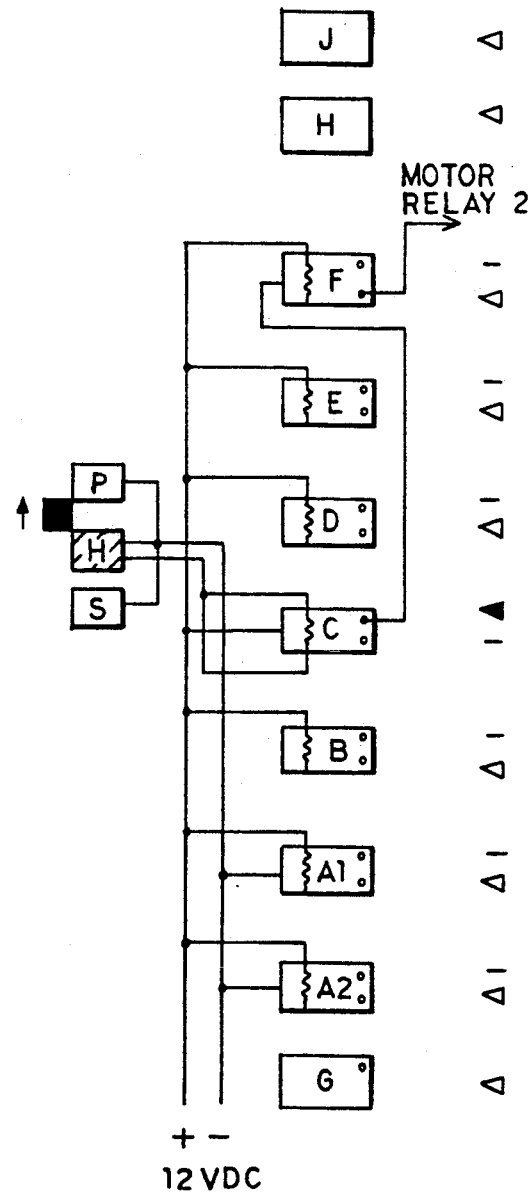

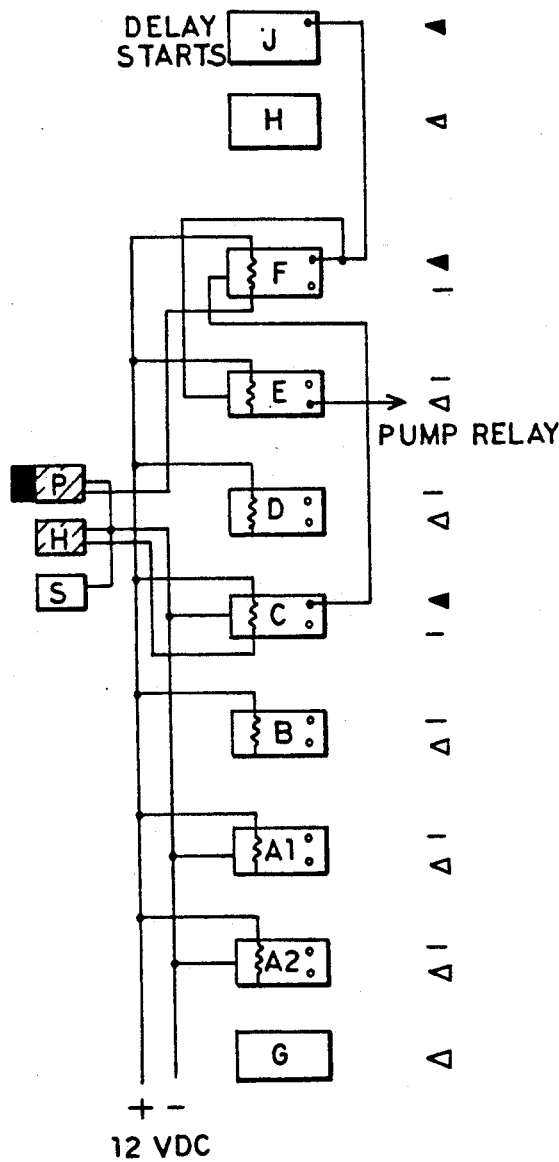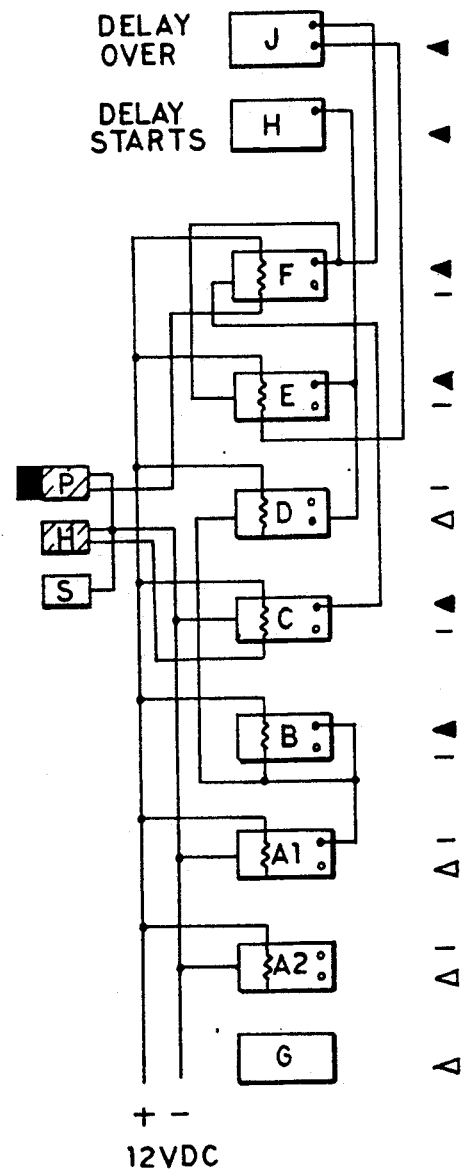
FIG. 22
FIG. 23

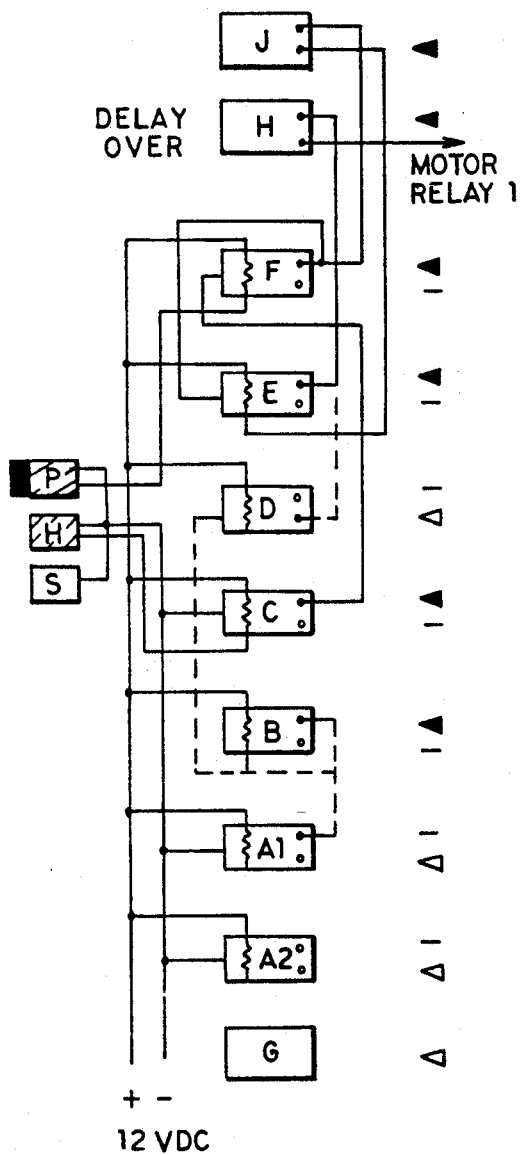
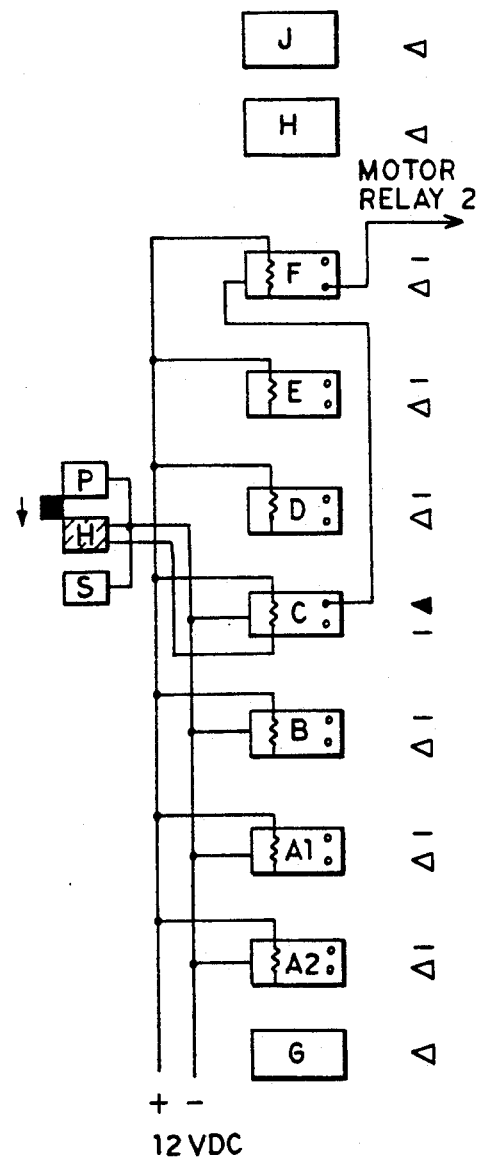
FIG. 24
FIG. 25

COMBINED PORTABLE ANIMAL WASTE AND TRAINING DEVICE

BACKGROUND OF THE INVENTION

1. Technical Field

This invention relates to a combined portable animal waste and training device.

2. Background

The problem in the art to which this invention apertains is the need for a combined portable animal waste and training device whereby the pet's owner, by means of the pavlovian facility and opportunity presented by the mutually dependent training structure and animal waste structure of the device, can induce, teach and train the pet to use the device to eliminate its urine and feces upon the animal waste structure, operatively emplaced upon a standard toilet bowl and followed by the automatic operation of the animal waste structure which disposes the pet's excretions into the standard toilet bowl and thereafter flushes down the pet's excretions.

SUMMARY OF THE INVENTION

Accordingly, the object of the invention is to contribute to the solution of the discussed problem of the art by providing a combined animal waste and training device having mutually dependent training and animal waste structures by means of which the pet's owner can induce, teach and train the pet to remain and live within the training structure and to access the animal waste structure to eliminate its urine and feces upon the animal waste structure, operatively emplaced upon a standard toilet bowl, and followed by the automatic operation of the animal waste structure which disposes the pet's excretions into the toilet bowl and thereafter flushes down the pet's excretions.

BRIEF DESCRIPTION OF THE DRAWINGS

FIG. 1 is a perspective view showing the combined portable animal waste and training device with its animal waste and training structures;

FIG. 1A is a perspective view showing another embodiment of a training structure that can be utilized with the portion of the animal waste structure shown in FIG. 1;

FIG. 5 is a perspective view shown the operating mechanism for lowering the pivoting platform to its normal lowered animal use position and for raising the pivoting platform to its raised or closed position;

FIG. 6 is a perspective view showing the position to which the crank, connecting rod and levers of the operating mechanism are motor-driven and disposed when the pivoting platform is in its raised or closed position;

FIG. 7 is a sectional view showing the animal waste structure with its pivoting platform in its normal lowered animal use position;

FIG. 9 is a sectional view showing the animal waste structure with its pivoting platform in its raised or closed position;

FIG. 10 is a perspective view showing the flushing mechanism for actuating the toilet tank lever arm for flushing down the toilet bowl;

FIGS. 12-26 show the details of the control system for the animal waste structure.

DETAILED DESCRIPTION OF THE PREFERRED EMBODIMENT

Figure 2:
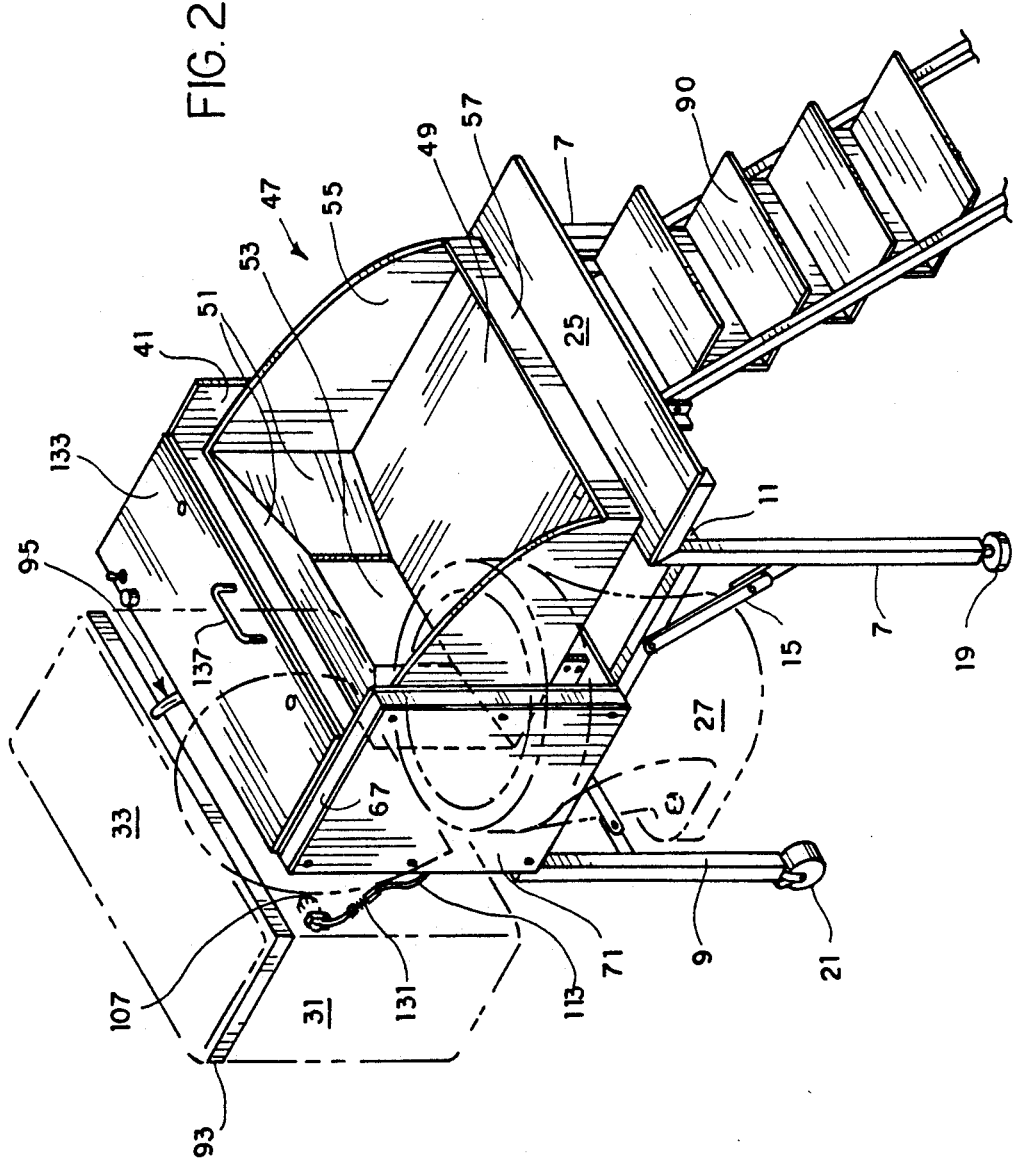
FIG. 2 is a perspective view showing the animal waste structure with its pivoting platform in its normal lowered animal use position for access thereupon by the pet.
Figure 3:
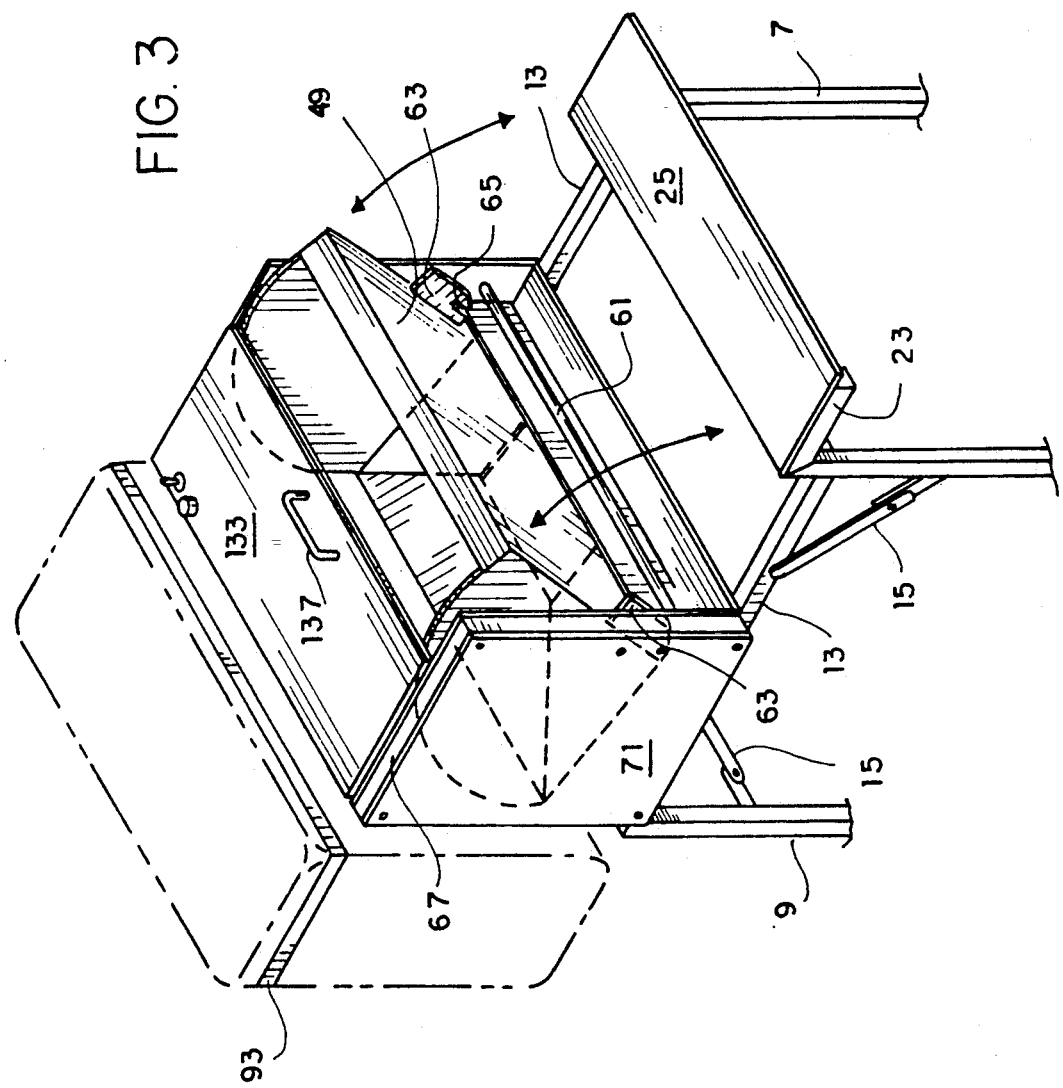
FIG. 3 is a perspective view showing the animal waste structure with its pivoting platform in a position between its normal lowered animal use position and its raised or closed position.
Figure 4:
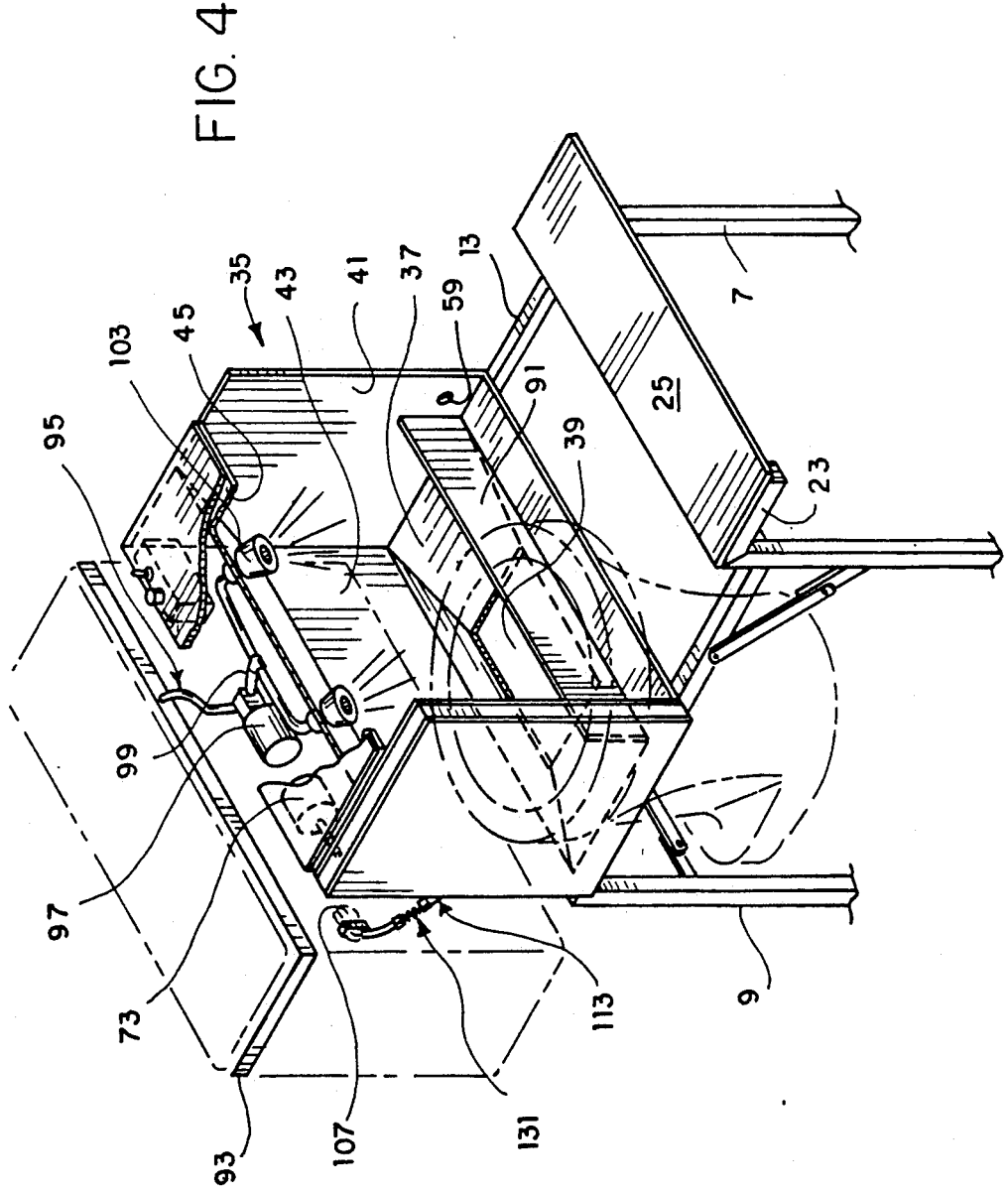
FIG. 4 is a perspective view showing the animal waste structure with its pivoting platform in its raised or closed position.

In FIG. 1 of the drawings, reference numeral 1 generally refers to the invention of the combined animal waste and training device, same having waste structure and training structure generally referred to by respective reference numerals 3 and 5.

Figure 8:
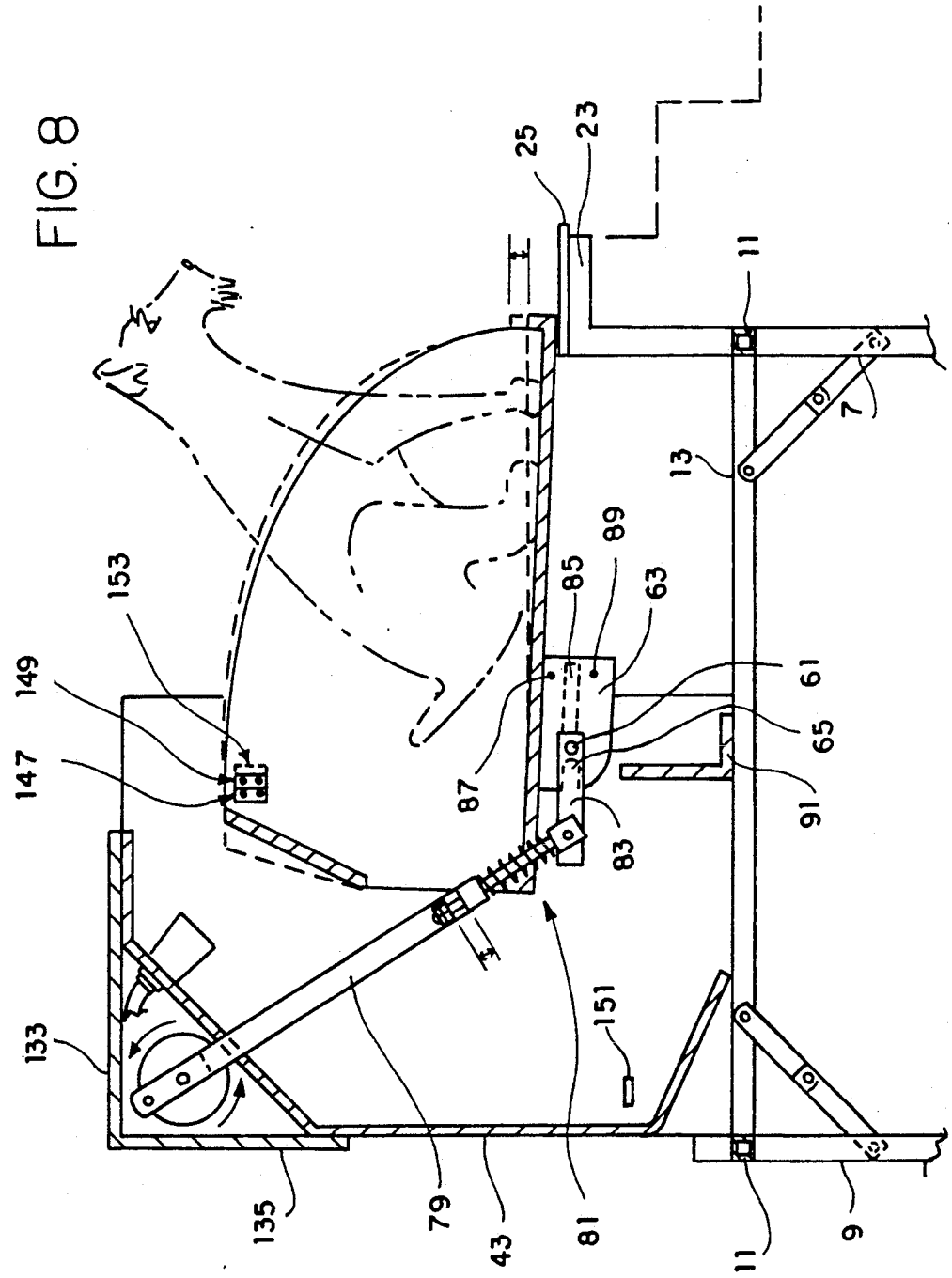
FIG. 8 is a sectional view showing the animal waste structure with its pivoting platform depressed 15 mm below its normal lowered animal use position, caused by the weight of the pet upon the pivoting platform.
Figure 11:
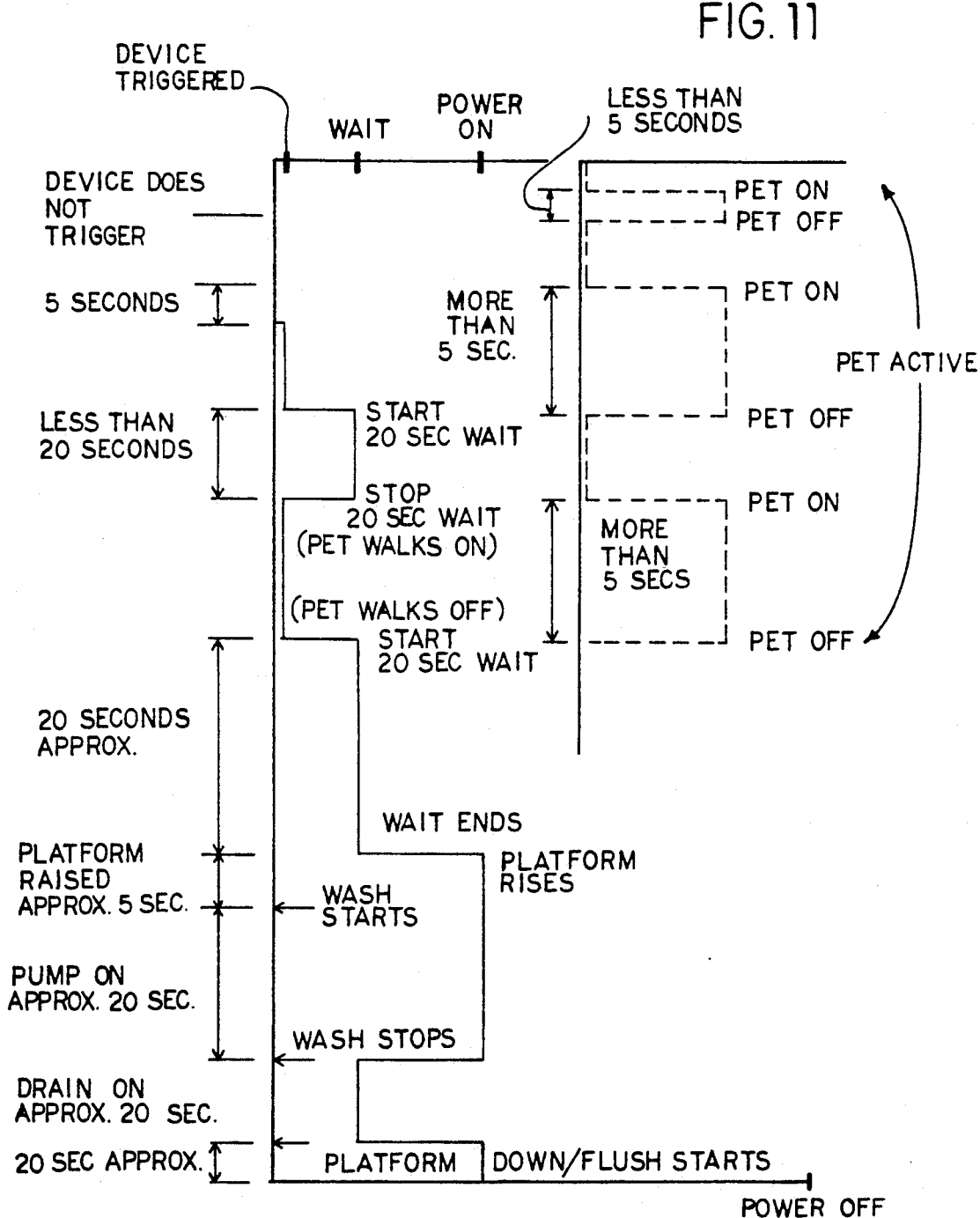
FIG. 11 shows, in graphical form, the operating sequence for the animal waste structure.

The animal waste structure 3 has a tubular metal frame mounting superstructure, defined by two vertical front legs 7 and two vertical rear legs 9. Structural rigidity is afforded by front and rear horizontal members 11 carried by and between the front legs 7, and between the rear legs 9; and by lateral horizontal members 13 carried by and between the right front leg 7 and right rear leg 9, and between the left front leg 7 and left rear leg 9. Further structural rigidity is afforded by angled bracing members 15 for the front and rear legs 7 and 9. Each front leg 7 carries a bottom foot 19 and each rear leg 9 carries a bottom caster 21. The front legs 7 have forwardly projecting short horizontal legs 23 which carry thereon a top tread 25 which provides still further structural rigidity for the frame mounting superstructure. In addition thereto, tread 25 further functions as a limit stop, as shown in FIG. 8.

The standard toilet comprises a toilet bowl 27, a toilet seat 29, a toilet tank 31 and a toilet tank cover 33.

Washdown box 35, made of plastic material, has a downwardly funneled bottom 37 with a central opening 39, side walls 41, a rear wall 43 and a top wall 45, as shown.

The frame mounting superstructure is positioned over the toilet bowl 27 and in close proximity to the front facing wall of the toilet tank 31, as shown. The washdown box 35 is so disposed and positioned upon the frame mounting superstructure such that the central opening 39 of the funneled bottom 37 of the washdown box 35 communicates directly with the toilet bowl 27.

A pivoting platform 47, made of plastic material, has a flat bottom surface 49, a rearwardly funneled rear wall 51 with an opening 53, side walls 55 and a front wall 57.

Aligned and opposed holes 59 in the facing side walls 41 of the washdown box 35 freely receive the ends of a transversely disposed pivot pin 61. Lateral right and left legs 63, depending from their respective side walls 55 of the pivoting platform 47, have slotted openings 65 freely receiving the pivot pin 61 in mounting relationship thereby. The pivot pin 61 functions as an axis around which the pivoting platform 47 can pivot and is constrained to pivot.

As viewed in FIGS. 1-4, a mechanism housing 67, defined by sides walls 69 and an access cover plate 71, is mounted on the exterior of the left side wall 41 of the washdown box 35.

As viewed in FIG. 5, as drive motor 73 has a drive shaft 75 fixed to the upper portion of a crank arm 77 whose lower portion is pivotally mounted to the upper portion of a connecting rod 79 whose lower portion mounts a spring link 81. As viewed in FIG. 6, the terminal end of the spring link 81 is pivotally mounted with the left end portion of a lever 83 whose right end portion is fixed to the transversely disposed pivot pin 61 projecting from the exterior surface of the depending left lateral leg 63. Another lever 85, disposed interiorly of the depending left lateral leg 63, has its left portion fixed to the transversely disposed pivot pin 61. The right portion of the lever 85 is disposed between upper and lower transverse abutment pins 87 and 89 projecting interiorly of the depending left lateral leg 63.

As viewed in FIG. 5, counter-clockwise rotation 180° of the drive shaft 75 will cause the pivoting platform 47 to be pivotally raised 90° to its raised or closed position, as shown in FIG. 9, by lever 85 engaging the upper abutment pin 87. Resumed counterclockwise rotation 180° of the drive shaft 75 will cause the pivoting platform 47 to be lowered 90° to its normal lowered animal use position shown in FIGS. 1, 2, 5 and 7 by lever 85 engaging the lower abutment pin 89.

Stairs 90 are provided leading from the training structure 5 in order that the pet can access the flat bottom surface 49 of the pivoting platform 47 when the pivoting platform 47 is in its normal lowered animal use position in order for the pet to eliminate its urine and feces upon the flat bottom surface 49.

Sequentially, after the pet departs from the flat bottom surface 49, the pivoting platform 47 is raised to its raised or closed position, as described and shown in FIG. 9. In such raised position, the portion of the flat bottom surface 49, in common with the front wall 91 of the washdown box 35, abuts the front wall 91 which functions as a limit stop, and the opening 53 in the rear wall 51 of the pivoting platform 47 is aligned with the central opening 39 in the bottom 37 of the washdown box 35. Eliminated urine and feces will flow and will be disposed into the toilet bowl 27 by being funneled by the rearwardly funneled rear wall 51 and opening 53 of the pivoting platform 47, and the downwardly funneled bottom 37 and central opening 39 of the washdown box 35. In the raised or closed position of the pivoting platform 47, the openings 39 and 35 are aligned; and the bottom 37, side walls 41, rear wall 43, top wall 45 and front wall 91, of the washdown box 35, together with the flat bottom surface 49, rear wall 51, side walls 55 and front wall 57, of the pivoting platform 47, define a washdown enclosure.

As shown in FIG. 9, a flat adapter member 93 is emplaced, in sandwiched relationship, between the top of the toilet tank 31 and the bottom of the toilet tank cover 33. A suction hose 95 is disposed within, but above, the bottom of the toilet tank 31 and angles through a complemental transverse opening in the front facing lateral side of the adapter member 93 and is operatively connected to a pump motor 97 which draws water from the toilet tank 31 through the suction hose 95 and pumps same under pressure to a discharge line 99, communicating via branch lines 101 with spraying heads 103 mounted on the rear wall 43 of the washdown box 35.

Sequentially, after the pivoting platform 47 has been raised to its raised or closed position, cleansing water thusly drawn from the toilet tank 31 is sprayed from the spraying heads 103 to cleanse the interior of the washdown enclosure, as heretofore described and defined, and thereby to clean and remove any residues of urine and feces eliminated by the pet, with such water-sprayed and removed residues flowing into the toilet bowl 27.

As shown in FIG. 10, a clamp 105 is attached to the flushing lever arm 107 for the toilet tank 31. The upper terminal end 109 of a bowden wire 111 is operatively carried by clamp 109. The upper end of the sheath 113 for the bowden wire 111 is clamped via clamp 115 secured to a plate adhesively attached to the front facing wall of the toilet tank 31 in proximal relationship to the flushing lever arm 107; and the lower end of the sheath 113 for the bowden wire 111 is clamped via a clamp 119 attached to the exterior surface of the left side wall 41 of the washdown box 35. The exterior surface of the left side wall 41 carries a pivot pin 121 that pivotally mounts a follower lever 123, trunnion-mounted, as indicated by reference numeral 125, to the lower terminal end 127 of the bowden wire 111. A tension spring 129, one ear of which is attached to the exterior surface of the left side wall 41 of the washdown box 35 and the other ear of which is attached to the follower lever 123, maintains the follower lever 123 in operative engagement with camming surface of the crank arm 77. Trained around the upper terminal end 109 of the bowden wire 111 is a compression spring 131.

Sequentially, during resumed counter-clockwise rotation 180° of the drive shaft 75 which causes the pivoting platform 47 to be lowered 90° to its normal lowered animal use position, the crank arm will cause the follower lever 123 to pivot first to its right, as viewed in FIGS. 5 and 10, pulling the bowden wire 111 and flushing lever arm 107 both downwardly thereby flushing the toilet tank 31 and flushing down the toilet bowl 27 along with all urine and feces, and residues thereof, in the toilet bowl 27, and at the same time compressing the compression spring 131. Continued counter-clockwise rotation of the drive shaft 75 will cause the follower lever to move to the left and thereby to return to its inoperative position, as shown in solid lines in FIGS. 5 and 10, and with the restoring force of the compression spring 131 causing the flushing lever arm 107 to return upwardly to its inoperative position.

The washdown box 35 has a top access cover plate 133, depending from which is a rear cover plate 135. A handle 137 is provided to facilitate movement and emplacement of the washdown box 35.

Figure 12:
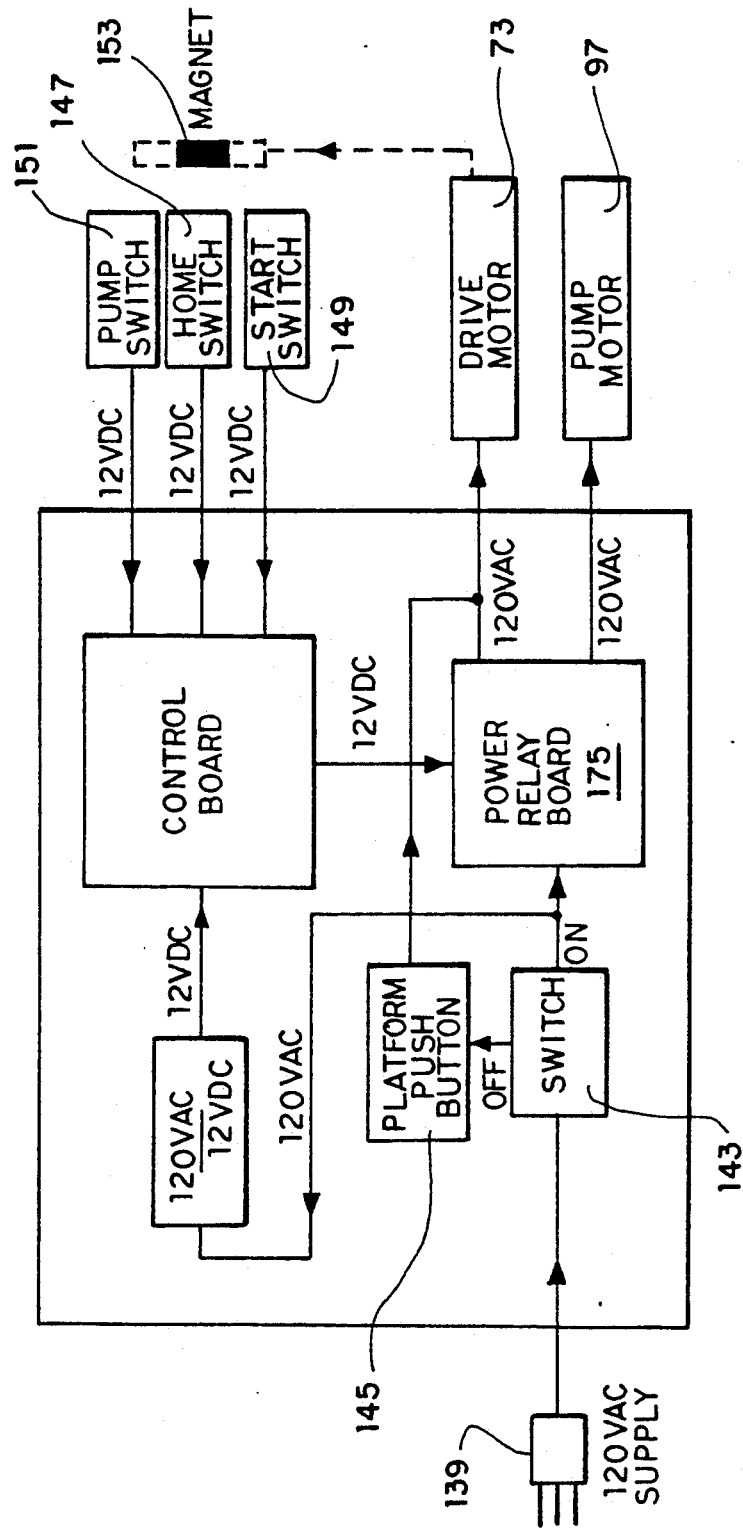

As shown in FIG. 5, a 120 VAC power supply lead 139 is disposed through the control box 141, mounted on the bottom surface of the top access cover plate 133. The control box houses the system's electrical and electronic control components. Power from the 120 VAC power supply lead 139 is controlled by a toggle switch 143 with the components further controlled by a platform push button switch 145. The system's components are shown more discernably in FIG. 12. As shown in FIG. 5, mounted on the exterior surface of the left side wall 41 of the washdown box 35 are a reed home switch 147, a reed start switch 149 and a reed pump switch 151, all of which are magnetically actuated. A magnet 153 is mounted on the exterior surface of the left side wall 55 of the pivoting platform 47.

Figure 13:
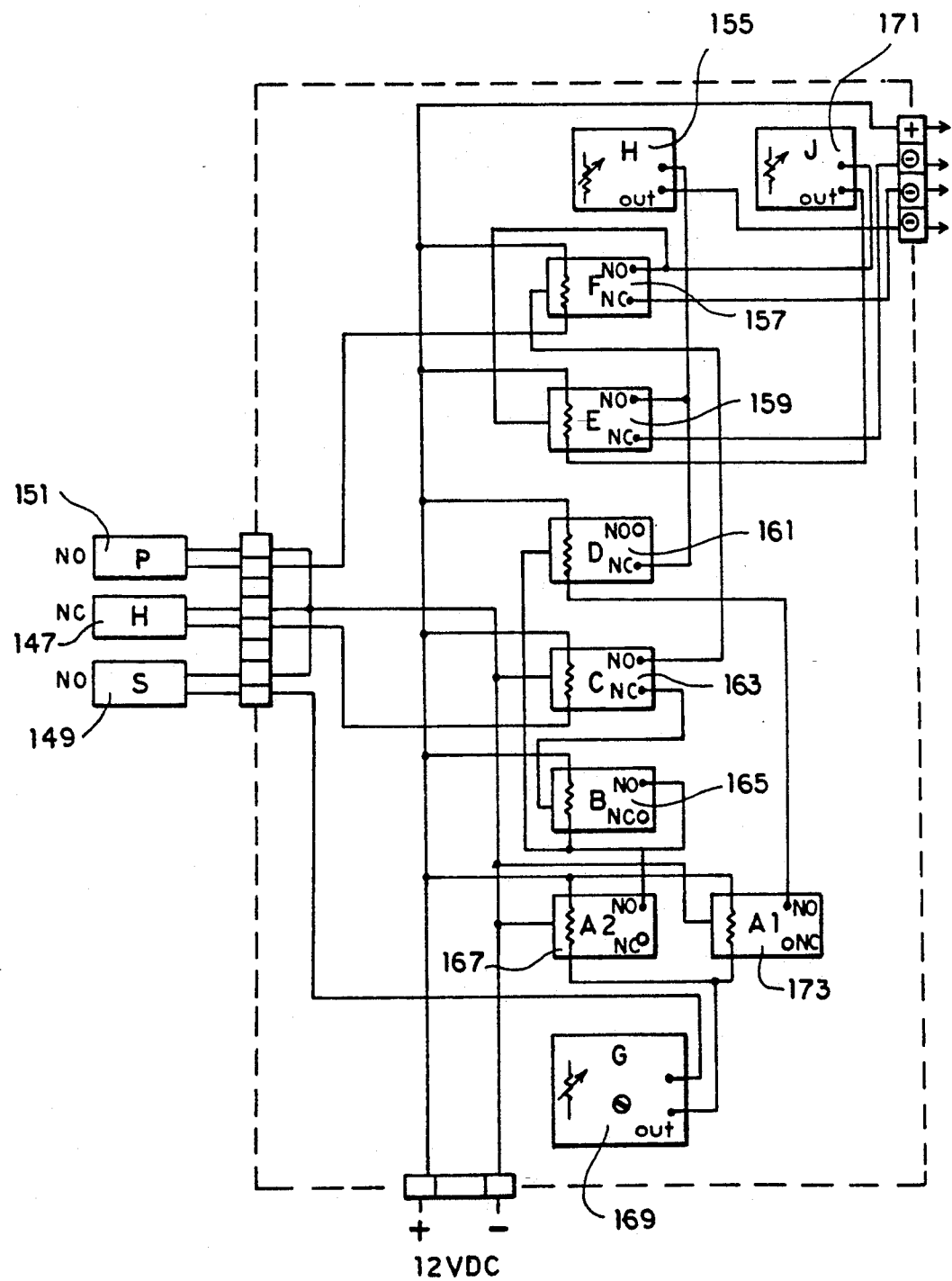

With reference to FIG. 13, "NO" means normally open and "NC" means normally closed. On the middle left side of FIG. 13, outside the enclosed representations of the components, "P" denotes the reed pump switch 151, "H" denotes the reed home switch 147 and "S" denotes the reed start switch 149. Within the enclosed representations of the components, "H" denotes the delay start timer 155, "F" denotes a relay 157, "E" denotes a relay 159, "D" denotes a relay 161, "C" denotes a relay 163, "B" denotes a relay 165, "A2" denotes a relay 167, "G" denotes a false start delay timer 169, "J" denotes a wash timer 171 and "A1" denotes a relay 173.

Figure 16:
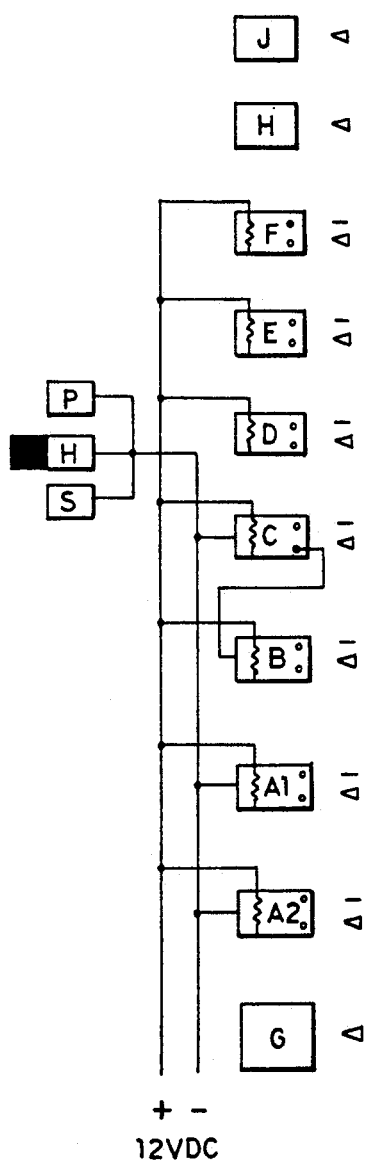

With reference to FIG. 7 and the representations of the components in FIG. 16, when the pivoting platform 47 is in its normal lowered animal use position, the normally closed reed home switch 147 is held open because of its immediate proximity of the magnet 153, and, as a consequence, no relays or timers in the electrical circuit are energized.

Figure 17:
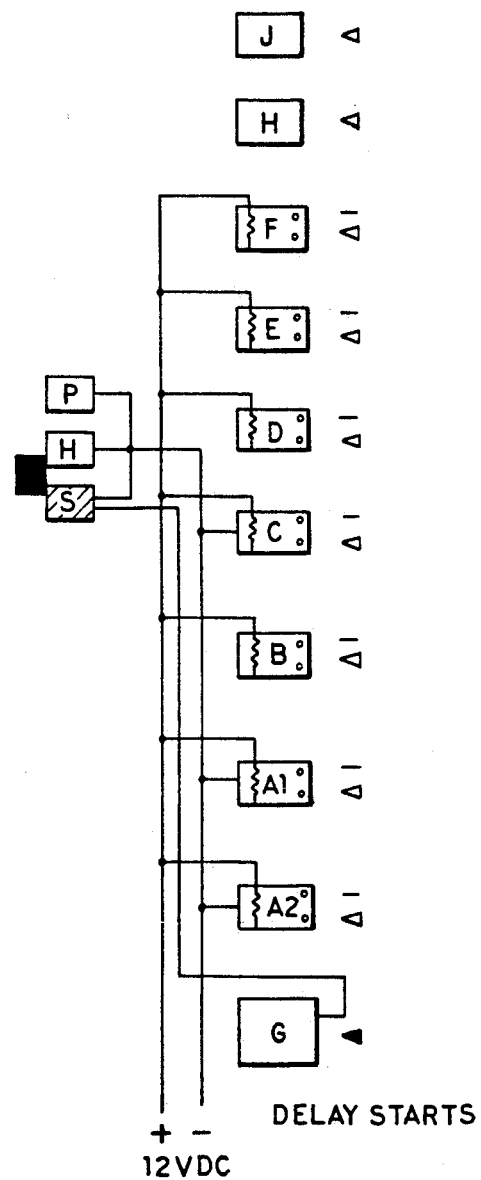

With reference to FIGS. 8 and 17, when the pet accesses the flat bottom surface 49 of the pivoting platform 47, the spring link 81 functions as a weight sensor in conjunction with the magnet 153. The weight of the pet on the flat bottom surface 49 compresses the compression spring element of the spring link 81 and the pivoting platform 47 pivots downwardly 15 mm with the bottom surface of the flat bottom surface 49 abutting the top tread 25, thereby causing the magnet 153 to close the normally open reed start switch 149 with normally closed reed home switch 147 still being held open by the magnet 153, and with the false start delay timer 169 energized.

With reference to FIG. 16, if the pet departs from the flat bottom surface 49 of the pivoting platform 47, the restoring force of the compression spring element of the spring link 81 returns the pivoting platform 47 to its normal lowered animal use position and the reed start switch 149 is reopened with the false start delay timer 169 de-energized.

Figure 18:
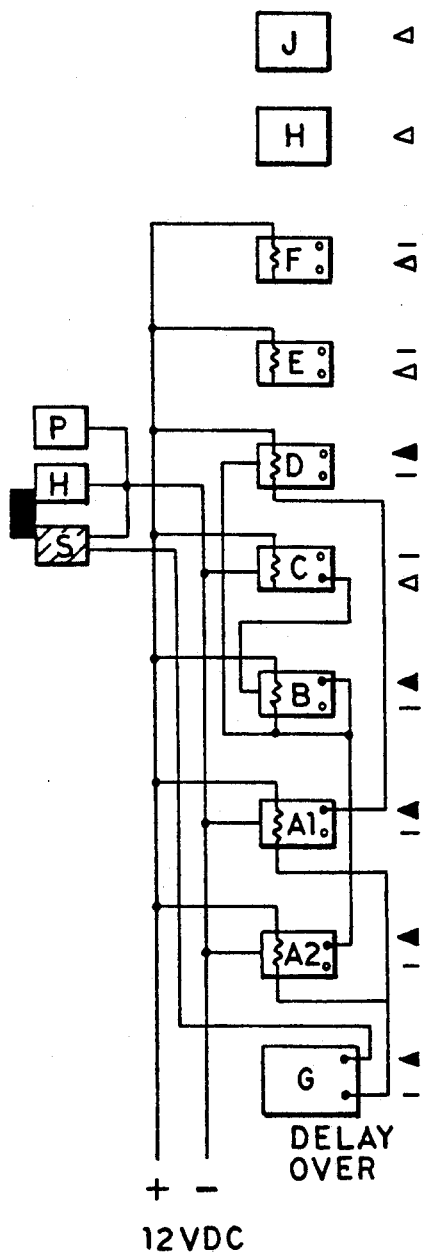

With reference to FIG. 18, if the pet accesses the flat bottom surface 49 and remains more than 5 seconds, the false start delay timer 169 provides output power which activates relays 167 and 173, with relay 167 switching the power to activate relay 165 that in turn switches power coming through relay 163 to supply power to relay 161. Relay 173 switches the power to activate relay 161. There is no output from relay 161 while it is activated.

Figure 19:
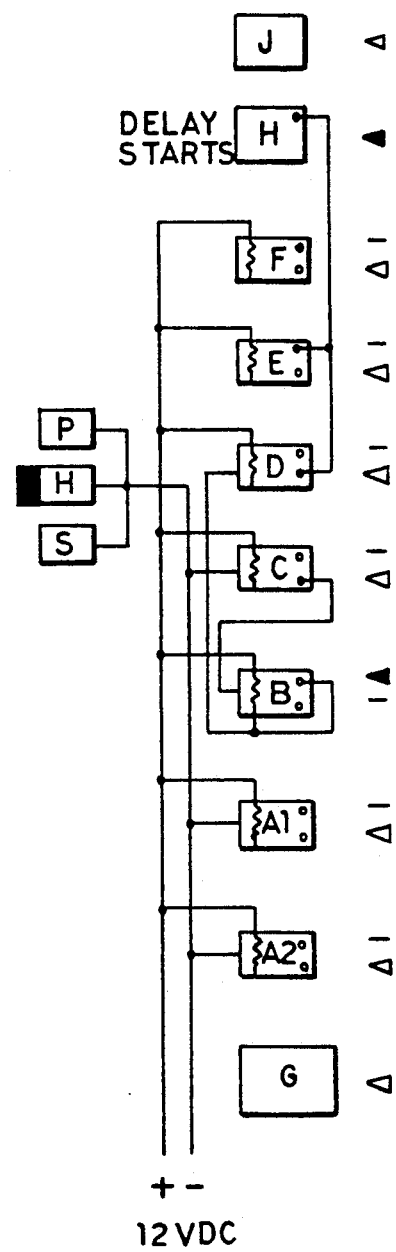

With reference to FIG. 19, when the pet departs from the flat bottom surface 49 after remaining thereon more than 5 seconds, the reed start switch 149 is opened, thereby removing power from the false start delay timer 169, which in turn deactivates relays 167 and 173. Relay 167 removes power from relay 165, which is now latched on with power from relay 163, thus maintaining power to relay 161. Relay 173 deactivates relay 161 (which has output when deactivated) which now switches power to delay start timer 155 to start a delay of approximately 20 seconds.

If the pet gets back on the flat bottom surface 49 of the pivoting platform 47 for more than 5 seconds but after less than 20 seconds has elapsed, the same condition obtains as previously described with reference to FIG. 18.

Figures 14, 15:
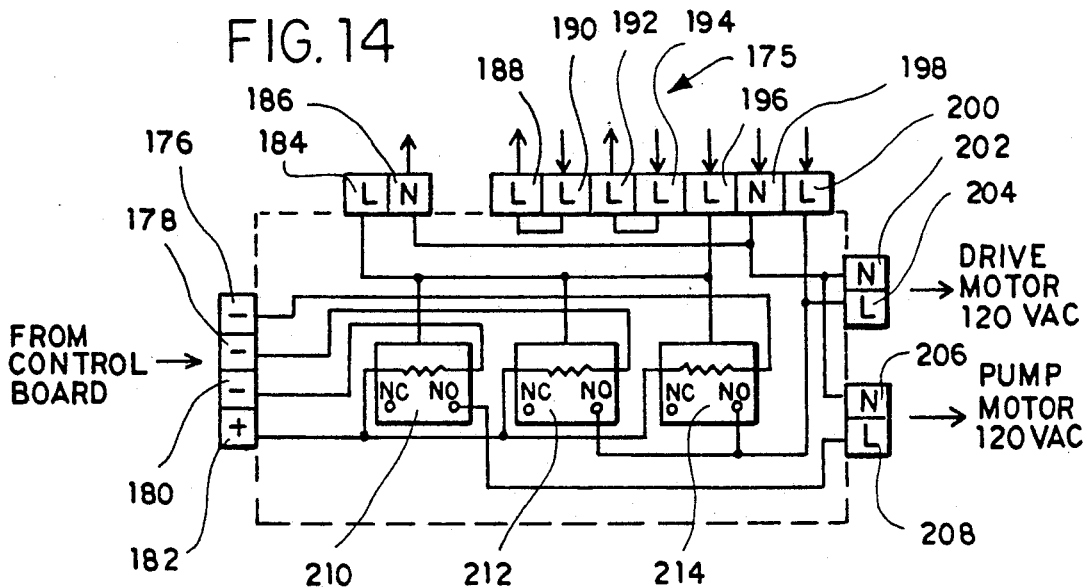

The power relay board 175, as shown in FIG. 14, shows the ground terminal 176 for the 120 VAC drive motor 73, the ground terminal 178 for the 120 VAC drive motor 73, the ground terminal 180 for the 120 VAC pump motor 97, the common positive terminal 182 for the 12 VDC power, the line terminal 184 for the 12 VDC power supply, the neutral terminal 186 to the 12 VDC power supply, the line terminal 188 to the platform push button switch 145, the line terminal 190 from the switch off, the line terminal 192 to the switch common, the line terminal 194 from the 120 VAC input, the line terminal 196 from the switch on, the line terminal 198 from the 120 VAC neutral input, the line terminal 200 from the platform push button switch 145, the neutral terminal 202 to the 120 VAC drive motor 73, the line terminal 204 to the 120 VAC drive motor 73, the neutral terminal 206 to the 120 VAC pump motor 97, the line terminal 208 to the 120 VAC pump motor 97, and the relays 210, 212 and 214.

With reference to FIG. 20, 20 seconds after the pet departs from the flat bottom surface 49 of the pivoting platform 47, the output power from the delay start timer 155 starts and is connected to the drive motor 73 via relay 214 on the power relay board 175.

With reference to FIG. 21, when the pivoting platform 47 starts rising toward its raised or closed position, such rising movement effected by the drive motor 73 removes the magnet 153 from the normally closed reed home switch 147, with the switch now supplying power to activate relay 163 which transfers power from relay 165 to relay 157. Relay 165 is now unlatched, removing power from relay 161, thus deactivating delay start timer 155. Relay 157 now supplies power to the drive motor 73, via relay 212 on the power relay board 175, to maintain driven movement of the pivoting platform 47 to its raised or closed position.

With reference to FIG. 22, when the pivoting platform 47 attains its raised or closed position, the magnet 153 closes the normally open reed pump switch 151. This activates relay 157, which switches power from the drive motor 73 to the wash timer 171, and supplies power through relay 159 to the pump motor 97, via relay 210 on the power relay board 175, thereby effecting the cleansing of the washdown enclosure for 20 seconds by means of water drawn through the suction hose 95 from the toilet tank 31 by action of the pump motor 97 and directed to and through the discharge line 99 and the branch lines 101, with such cleansing water being discharged under pressure from the spraying heads 103 within the washdown enclosure.

With reference to FIG. 23, upon completion of the 20-seconds cleansing action of the spraying heads 103 spraying cleansing water within the washdown enclosure, wash timer 171 switches on, which activates relay 159 switching power from the pump motor 97 to the delay start timer 155, thereby allowing the sprayed cleansing water and residues of urine and feces to drain for 20 seconds through the opening 53 of the rear wall 51 of the pivoting platform 47 and the central opening 39 in the bottom 37 of the washdown box 35 and into the toilet bowl 27.

With reference to FIG. 24, upon completion of such 20 seconds of the water-sprayed residues of urine and feces through the aligned openings 53 and 39 of the rear wall 51 of the pivoting platform 47 and the bottom 37 of the washdown box 35, respectively, into the toilet bowl 27, delay start timer 155 switches on, which supplies power directly to the drive motor 73, via relay 214 on the power relay board 175, to commence the return of the pivoting platform 47 toward its normal lowered animal use position for subsequent utilization by the pet.

With reference to FIG. 25, when the magnet 153 moves out of position from the reed pump switch 151, in the course of the pivoting platform 47 beginning its return to its normal lowered animal use position, the reed pump switch 151 is opened thus deactivating relay 157 that in turn switches power from relay 159 and wash timer 171, thereby removing power from the drive motor 73 via delay start timer 155 directly to the drive motor 73, via relay 212 on the power relay board 175, thus maintaining the return movement of the pivoting platform 47 towards its normal lowered animal use position.

Figure 26:
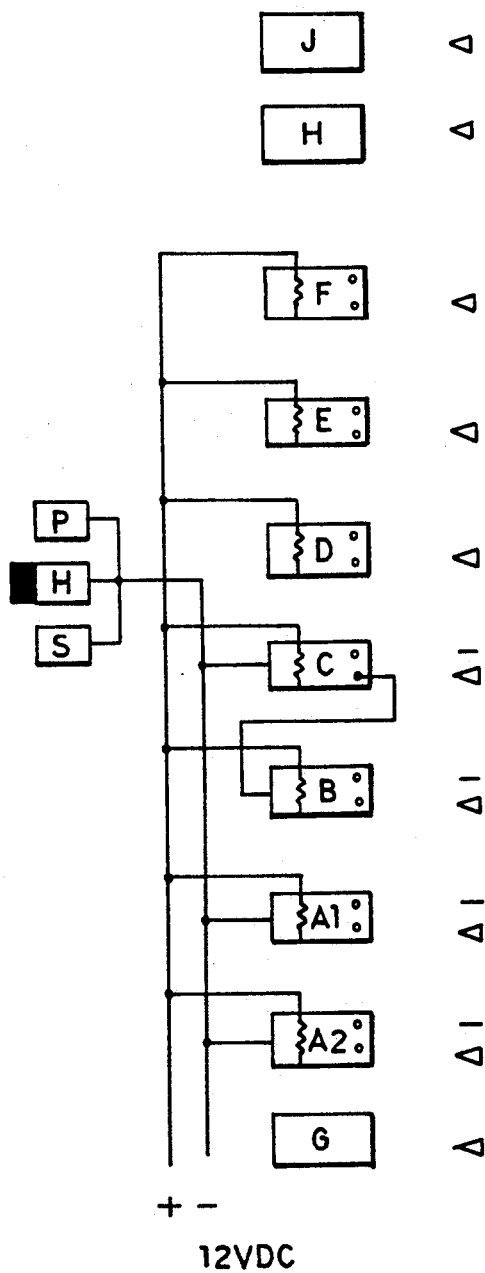

With reference to FIG. 26, when the pivoting platform 47 reaches its normal lowered animal use position, the reed home switch 147 is opened upon being energized by magnet 153. This deactivates relay 163 which switches off power to the drive motor 73 via relay 157.

The following electrical/electronic components may be utilized to the animal waste structure 3:

Drive motor 73: part number 3M231, manufactured by Grainger Inc.; pump motor 97: part number 1P579E, manufactured by Grainger Inc.; switch 143: part number 275-409, manufactured by Radio Shack; switch 145: parts numbers 275-609, 275-618 or 275-1566, manufactured by Radio Shack; magnetic reed switch 147: part number 49-495, manufactured by Radio Shack; magnetic reed switches 149 and 151: part number 49-512, manufactured by Radio Shack; timers 155, 169 and 171: part number Q1F-00060-316, manufactured by National Controls Corp.; relays 157, 159, 161, 163, 165, 167, 173, and the three relays for the power relay board 175: parts numbers 275-219, 275-248, 275-249 or 275-241, manufactured by Radio Shack; the potentiometers for the timers 155, 169 and 171: parts numbers 271-229 or 271-211, manufactured by Radio Shack; and the power supply: part number 273-1652, manufactured by Radio Shack.

As shown in FIG. 1, the training structure has an open box structure having a bottom and four surrounding side walls 179, 181, 183 and 185. Emplaced therein are a pet bed 187, water bowl 189 and a food bowl 191. With the pet bed 187, water bowl 189 and food bowl 191, together with the surrounding box structure, and keeping the pet in the box, a pavlovian facility and opportunity is presented for the pet's owner to induce, teach and train the pet to mount the stairs 90 and access the flat bottom surface 49 of the pivoting platform 47 in its normal lowered animal use position to eliminate its urine and feces upon the flat bottom surface 49. Three factors contribute to the pet's mounting the stairs 90 to access the flat bottom surface 49 to eliminate its urine and feces thereon. First, the training structure provides a natural environment in which to live, sleep, drink and eat. Second, is the trial-and-error effort on the part of the pet's owner in inducing, teaching and training the pet to mount the stairs 90 to access the flat bottom surface 49 to eliminate its urine and feces thereon. And third, such inducement is reinforced by the pet's natural instincts not to soil the natural environment where it lives, sleeps, drinks and eats by eliminating its urine and feces in such natural environment; but rather to go to a different area to eliminate its urine and feces. The flat bottom surface 49 of the pivoting platform 47 in its normal lowered animal use position presents and provides such different area to which the pet can go to eliminate its urine and feces. From empirical observations by the inventors in so training pets to eliminate their urine and feces upon the flat bottom surface 49, the inventors have been gratified that it only takes, in some instances, a week to thusly induce, teach and train pets to mount the stairs 90 to access the flat bottom surface 49 to eliminate its urine and feces thereon. With respect to the third factor, when such inducement is reinforced by the pet's natural instincts, the pet induces, teaches and trains itself.

Shown in FIG. 1A is another embodiment of the animal training structure, generally referred to by reference numeral 193, that can be utilized with the animal waste structure 3 to greatly accelerate the inducement, teaching and training of the pet. The training structure 193 has an open box structure having a bottom and four surrounding side walls 195, 197, 199 and 201, Emplaced therein are a pet bed 203, water bowl 205 and a food bowl 207. Side wall 199 differs from side wall 183 of the training structure 3 in that the lowermost portion of the stairs 90 terminates at the side wall 199 which has a full-height opening 209 to allow the pet to leave through opening 209 to mount the stairs 90 to access the flat bottom surface 49 of the pivoting platform 47 to eliminate its urine and feces thereon, and to retrace its steps in returning to the open box structure. A protective wall panel 211 for the left side of the washdown box 35 and stairs 90 has an L-shaped portion with a long leg 213 and a short leg 215, and a wall-panel portion 217 for the stairs 90. The rear vertical trailing edge of the long leg 213 abuts the front facing portion of the access cover 71 and the front facing vertical edge of the wall portion 217 abuts the side wall 199 adjacent opening 209. Common bottom portions of the long leg 213 and short leg 213 abut and rest upon the top tread 25. The top edge of the wall panel 211 mounts a channel member 219 having male portions of snap fasteners 221. A protective wall panel 223, similar to wall panel 211 but with requisite difference in orientation, is disposed with respect to the front facing vertical edge of the right side wall 41 of the washdown box 35, and the front facing vertical edge of the wall portion, similar to the wall portion 217, abuts the side wall 199 adjacent the right side of the opening 209. The top edges of the side walls 195, 197, 199 and 201 mount a channel member, similar to channel member 219 and have male portions of similar snap fasteners 221. A flexible mesh 225, of integral, one-piece construction and complemental shape, carrying the female portions of the snap fasteners 221, is emplaced, as shown, with the aligned female and male portions of the snap fasteners 221 being removably engaged. The flexible mesh 225 prevents the pet from jumping over the side walls 195, 197, 199 and 201 of the box structure; and the protective wall panels 211 and 223, and the flexible mesh 225, prevent the pet from either leaving the lateral sides of the stairs 90 and the animal waste structure 3, or jumping over same. The training structure 193 has the same attributes as the training structure 5, as described; however, the training structure 193 further confines the pet to its natural environment of the box structure, with the result that inducement, teaching and training of the pet to eliminate its urine and feces on the flat bottom surface 49 of the pivoting platform will be greatly accelerated.

We claim:

1. In combination, a portable animal waste and training device comprising mutually dependent training and animal waste structures by which a pet's owner can induce, teach and train a pet to remain, live, sleep, drink and eat within said training structure, and, when the need arises for the pet to eliminate its urine and feces, to induce, teach and train the pet to leave the training structure and to access the animal waste structure to eliminate its urine and feces; said training structure having environment means for inducing, teaching and training the pet to remain, live, sleep, drink and eat therein, and to return to said environment means after the pet has eliminated its urine and feces; said animal waste structure having washdown box means in operative emplacement relative to a toilet bowl of a standard toilet having a toilet tank, said animal waste structure having pivoting platform means, said washdown box means and said pivoting platform means having cooperating means for pivoting said pivoting platform means from a normal lowered animal use position to a raised or closed position and to return to the normal lowered animal use position, said pivoting platform means, in its lowered animal use position, providing the pet access thereto to eliminate thereon its urine and feces, said washdown box means and said pivoting platform means having opening means, said opening means of said pivoting platform means, in its raised or closed position, establishing communication with said opening means of said washdown box means and the toilet bowl for disposal through said opening means of both said pivoting platform means and said washdown box means and into the toilet bowl of the urine and feces eliminated by the pet, and said pivoting platform means providing a different area for the pet to eliminate its urine and feces thereon, and whereby the pet, in following its natural instincts not to befoul the environment means where it remains, lives, sleeps, drinks and eats, but rather to utilize a different area to eliminate its urine and feces, is induced, by reason that its natural instincts are reinforced, and it concomitantly induces itself thereby, to select said pivoting platform means as the different area at which to eliminate its urine and feces, and, in consequence thereof, teaches itself and trains itself to utilize said pivoting platform means as the different area at which to eliminate its urine and feces.

2. A portable animal waste and training device in accordance with claim 1, wherein, in the raised or closed position of said pivoting platform means, said pivoting platform means together with said washdown box means define a washdown enclosure, and wherein is further provided pump means, wherein said cooperating means actuates said pump means to draw water from said toilet tank and spray the water under pressure within said washdown enclosure to cleanse the washdown enclosure to thereby clean and remove any residues from urine and feces theretofore eliminated by the pet, and with such water-sprayed and removed residues of urine and feces being disposed through the openings of said washdown box means and pivoting platform means and into said toilet bowl.

3. A portable animal waste and training device in accordance with claim 2, Wherein said toilet tank has a flushing lever arm having an operative-mode position whereby said toilet tank is flushed thereby flushing down said toilet bowl, wherein is further provided flushing means disposing said flushing lever arm in its operative-mode position to flush said toilet tank, and wherein said cooperating means of said washdown box means and said pivoting platform means actuates said flushing means to dispose said flushing lever arm in its operative-mode position to thereby flush said toilet tank and flush down urine and feces theretofore eliminated by the pet and disposed in said toilet bowl.

4. A portable animal waste and training device in accordance with claim 3, wherein said cooperating means of said washdown box means and said pivoting platform means has control means, wherein said control means, sequentially, controls the pivoting of said pivoting platform means to its normal lowered animal use position, controls the raising of said pivoting platform means to its raised or closed position, controls the cleansing of the washdown enclosure, controls the flushing of the toilet tank and controls the return of said pivoting platform means to its normal lowered animal use position.

5. A portable animal waste and training device in accordance with claim 4, wherein said training device has enclosure means, sleeping means, drinking means and food means, said sleeping means providing a facility for the pet to sleep, said drinking means providing a facility for the pet to drink and said food means providing a facility for the pet to eat, and said sleeping means, drinking means and food means cooperating with said enclosure means to induce the pet to remain and live in said enclosure means.

6. A portable animal waste and training device in accordance with claim 1, wherein said toilet tank has a flushing lever arm having an operative-mode position whereby said toilet tank is flushed thereby flushing down said toilet bowl, wherein is further provided flushing means disposing said flushing lever arm in its operative-mode position to flush said toilet tank, and wherein said cooperating means of said washdown box means and said pivoting platform means actuates said flushing means to dispose said flushing lever arm in its operative-mode position to thereby flush said toilet tank and flush down urine and feces theretofore eliminated by the pet and disposed in said toilet bowl.

7. A portable animal waste and training device in accordance with claim 1, wherein said training structure has enclosure means, sleeping means, drinking means and food means, said sleeping means providing a facility for the pet to sleep, said drinking means providing a facility for the means to drink and said food means providing a facility for the pet to eat, and said sleeping means, drinking means and food means cooperating with said enclosure means to induce the pet to remain and live in said enclosure means.

8. A portable animal waste and training device in accordance with claim 6, wherein said training structure further comprises confining means to restrict the pet to its enclosure means to greatly accelerate the inducement, teaching and training of the pet.

* * * * *